(12) United States Patent
Ivershen et al.

(10) Patent No.: US 8,811,289 B2
(45) Date of Patent: Aug. 19, 2014

(54) S1-MME AND LTE-UU INTERFACE CORRELATION IN LONG TERM EVOLUTION NETWORKS

(75) Inventors: Aleksey G. Ivershen, Garland, TX (US); Vignesh Janakiraman, Plano, TX (US); Martin Winau, Berlin (DE); Ralf Kreher, Berlin (DE); Julien Schnerrer, Berlin (DE); Martin Polak, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 111 days.

(21) Appl. No.: 13/535,987

(22) Filed: Jun. 28, 2012

(65) Prior Publication Data

US 2014/0003333 A1     Jan. 2, 2014

(51) Int. Cl.
*H04W 92/02*     (2009.01)
(52) U.S. Cl.
USPC .......................................................... 370/328
(58) Field of Classification Search
CPC ..... H04Q 11/06; H04W 68/00; H04W 80/02; H04W 92/16; H04W 92/02
USPC ........................... 370/254–350; 709/201–213
See application file for complete search history.

(56) References Cited

U.S. PATENT DOCUMENTS

| | | | | |
|---|---|---|---|---|
| 8,041,392 B2 * | 10/2011 | Yamamoto | ..................... | 455/561 |
| 8,064,907 B2 * | 11/2011 | Gallagher et al. | ......... | 455/435.1 |
| 8,219,088 B2 * | 7/2012 | Yeoum et al. | .............. | 455/435.1 |
| 8,243,725 B2 * | 8/2012 | Aghili et al. | ................... | 370/354 |
| 8,289,926 B2 * | 10/2012 | Wu | ................................ | 370/331 |

FOREIGN PATENT DOCUMENTS

| | | |
|---|---|---|
| CN | 102 196 349 A | 9/2011 |
| EP | 2 341 665 A1 | 7/2011 |
| GB | 2 465 810 A | 6/2010 |

OTHER PUBLICATIONS

European Search Report dated Nov. 8, 2013 in corresponding European Patent Application No. 13173721.5.

* cited by examiner

*Primary Examiner* — Ayaz Sheikh
*Assistant Examiner* — Debebe Asefa
(74) *Attorney, Agent, or Firm* — Edwards Wildman Palmer LLP; Scott D. Wofsy; George N. Chaclas

(57) ABSTRACT

Systems and methods for Long Term Evolution (LTE) interface correlation are described. In some embodiments, a method may include receiving a first message, the first message having been intercepted over an air (Uu) interface of an LTE network (e.g., probed via a Common Public Radio Interface (CPRI) between an Evolved-Universal Terrestrial Radio Access Network (UTRAN) Node B (eNB)'s remote radio head and baseband processing unit), the first message having a first identifier. The method may also include receiving a second message, the second message having been intercepted over the S1 interface between the eNB and a Mobility Management Entity (MME) within an Evolved Packet Core (EPC) portion of the LTE network within a given time window from the first message, the second message having a second identifier. The method may further include correlating the first and second messages in response to a match between the first and second identifiers.

21 Claims, 3 Drawing Sheets

*FIG. 4*

S1-MME AND LTE-UU INTERFACE CORRELATION IN LONG TERM EVOLUTION NETWORKS

BACKGROUND

LTE (Long Term Evolution) access technology is used for 4G deployments around the world. LTE provides very fast, highly responsive mobile data services to support increasing user demand for mobile broadband services. LTE represents a significant shift from legacy mobile systems as an all-IP (Internet Protocol) network technology. LTE is a comprehensive transition towards a packet-switched-only system that is non-hierarchical and that makes wide use of 3GPP (Third Generation Partnership Project) protocols and practices. LTE is also designed to be interoperable with legacy Universal Mobile Telecommunications System (UMTS) systems and offers support for seamless mobility through non-3GPP wireless accesses including, for example, WiMAX and Wi-Fi.

The LTE access network incorporates state-of-the-art air interface technologies including OFDMA (Orthogonal Frequency Division Multiple Access) and advanced antenna techniques to maximize the efficient use of RF spectrum. It also accommodates several options for frequency bands, carrier bandwidths, and duplexing techniques to effectively utilize the different portions of unused spectrum in different countries and geographies. Most significantly, the LTE network architecture's evolution to an all-IP architecture enables seamless delivery of applications and services.

SUMMARY

Embodiments of systems and methods for Long Term Evolution (LTE) interface correlation are described herein. In an illustrative, non-limiting embodiment, a method may include receiving a first message, the first message having been intercepted over a wireless interface of a Long Term Evolution (LTE) network, extracting a first identifier from the first message, receiving a second message, the second message having been intercepted over a wireline interface of the LTE network, extracting a second identifier from the second message, and associating the second message with the first message in response to the second identifier matching the first identifier.

In some cases, the wireless interface may be an air (Uu) interface. For example, the Uu interface may have been probed via a Common Public Radio Interface (CPRI) between an Evolved-Universal Terrestrial Radio Access Network (UTRAN) Node B (eNB)'s remote radio head and baseband processing unit. Also, in some cases, the wireline interface may be an S1 interface between an Evolved-Universal Terrestrial Radio Access Network (UTRAN) Node B (eNB) and a Mobility Management Entity (MME) within an Evolved Packet Core (EPC) portion of the LTE network.

In some embodiments, the first message may be a Uu Radio Resource Control (RRC) Connection Request message, and the second message may be an S1-Mobility Management Entity (MME) Initial User Equipment (UE) Message including at least one of: an Evolved Packet System (EPS) Attach Request, an EPS Tracking Area Update (TAU) Request, or an EPS Service Request. The first identifier may be a System Architecture Evolution (SAE) Temporary Mobile Subscriber Identity (S-TMSI) extracted from the Uu RRC Connection Request, and the second identifier may be an S-TMSI extracted from the S1-MME Initial UE Message.

In some implementations, the first identifier may be a combination of an Application Protocol Identity (AP-Id) allocated to a UE device over the S1 interface within the eNB (eNB-UE-S1AP-Id) with another AP-Id allocated to the UE device over the S1 interface within the MME (MME-UE-S1AP-Id) extracted from an eNB trace feed or over-the-air with a probing device, and the second identifier may be a combination of an eNB-UE-S1AP-Id with an MME-UE-S1AP-Id extracted from an S1-AP message. Additionally or alternatively, the first identifier may be an International Mobile Subscriber Identity (IMSI), Globally Unique Temporary ID (GUTI), or System Architecture Evolution (SAE) Temporary Mobile Subscriber Identity (S-TMSI) of an Evolved Packet System (EPS) Non-Access Stratum (NAS) payload extracted from an Uu RRC message or over-the-air with a probing device configured to decipher EPS NAS messages, and the second identifier may be an IMSI, GUTI, or S-TMSI of an EPS NAS payload extracted from an S1-MME message. For example, the first and second messages may have been intercepted within a preselected time window.

In another illustrative embodiment, a system may include a processor and a memory coupled to the processor, the memory configured to store program instructions executable by the processor to cause the system to receive a first message, the first message having been intercepted over an air (Uu) interface of a Long Term Evolution (LTE) network, the first message having a first identifier, receive a second message, the second message having been intercepted over an S1 interface between an Evolved-Universal Terrestrial Radio Access Network (UTRAN) Node B (eNB) and a Mobility Management Entity (MME) within an Evolved Packet Core (EPC) portion of the LTE network within a configurable time window from the first message, the second message having a second identifier, and correlate the first message with the second message in response to a match between the first and second identifiers.

In some implementations, the Uu interface may have been probed via a Common Public Radio Interface (CPRI) between the eNB's remote radio head and baseband processing unit, the first message may be a Uu Radio Resource Control (RRC) Connection Request message, and the second message may be an S1-Mobility MME Initial User Equipment (UE) Message including at least one of: an Evolved Packet System (EPS) Attach Request, an EPS Tracking Area Update (TAU) Request, or an EPS Service Request. Moreover, the first identifier may be a System Architecture Evolution (SAE) Temporary Mobile Subscriber Identity (S-TMSI) extracted from the Uu RRC Connection Request, and the second identifier may be an S-TMSI extracted from the S1-MME Initial UE Message.

In some embodiments, the first identifier may be a combination of an Application Protocol Identity (AP-Id) allocated to a UE device over the S1 interface within the eNB (eNB-UE-S1AP-Id) with another AP-Id allocated to the UE device over the S1 interface within the MME (MME-UE-S1AP-Id) extracted from an eNB trace feed or over-the-air with a probing device, and the second identifier may be a combination of an eNB-UE-S1AP-Id with an MME-UE-S1AP-Id extracted from an S1-AP message. Additionally or alternatively, the first identifier may be an International Mobile Subscriber Identity (IMSI), Globally Unique Temporary ID (GUTI), or System Architecture Evolution (SAE) Temporary Mobile Subscriber Identity (S-TMSI) of an Evolved Packet System (EPS) Non-Access Stratum (NAS) payload extracted from an Uu RRC message or over-the-air with a probing device configured to decipher EPS NAS messages, and the second identifier may be an IMSI, GUTI, or S-TMSI of an EPS NAS payload extracted from an S1-MME message.

In yet another illustrative, non-limiting embodiment, a tangible electronic storage medium may have program instructions stored thereon that, upon execution by a processor within a computer system, cause the computer system to receive a first message, the first message having been intercepted over an air (Uu) interface of a Long Term Evolution (LTE) network probed via a Common Public Radio Interface (CPRI) between an Evolved-Universal Terrestrial Radio Access Network (UTRAN) Node B (eNB)'s remote radio head and baseband processing unit, the first message having a first identifier, receive a second message, the second message having been intercepted over an S1 interface between the eNB and a Mobility Management Entity (MME) within an Evolved Packet Core (EPC) portion of the LTE network within a given time window from the first message, the second message having a second identifier, and correlate the first and second messages in response to a match between the first and second identifiers.

For example, the first message may be a Uu Radio Resource Control (RRC) Connection Request message, and the second message may be an S1-MME Initial User Equipment (UE) Message including at least one of: an Evolved Packet System (EPS) Attach Request, an EPS Tracking Area Update (TAU) Request, or an EPS Service Request. Additionally or alternatively, the first identifier may be a System Architecture Evolution (SAE) Temporary Mobile Subscriber Identity (S-TMSI) extracted from the Uu RRC Connection Request, and the second identifier may be an S-TMSI extracted from the S1-MME Initial UE Message. Additionally or alternatively, the first identifier may be a combination of an Application Protocol Identity (AP-Id) allocated to a UE device over the S1 interface within the eNB (eNB-UE-S1AP-Id) with another AP-Id allocated to the UE device over the S1 interface within the MME (MME-UE-S1AP-Id) extracted from an eNB trace feed, and the second identifier may be a combination of an eNB-UE-S1AP-Id with an MME-UE-S1AP-Id extracted from an S1-AP message. Additionally or alternatively, the first identifier may be an International Mobile Subscriber Identity (IMSI), Globally Unique Temporary ID (GUTI), or System Architecture Evolution (SAE) Temporary Mobile Subscriber Identity (S-TMSI) of an Evolved Packet System (EPS) Non-Access Stratum (NAS) payload extracted from an Uu RRC message, and the second identifier may be an IMSI, GUTI, or S-TMSI of an EPS NAS payload extracted from an S1-MME message.

In some embodiments, one or more of the methods described herein may be performed by one or more computer systems. In other embodiments, a tangible computer-readable storage medium may have program instructions stored thereon that, upon execution by one or more computer or network monitoring systems, cause the one or more computer systems to perform one or more operations disclosed herein. In yet other embodiments, a system may include at least one processor and a memory coupled to the at least one processor, the memory configured to store program instructions executable by the at least one processor to perform one or more operations disclosed herein.

BRIEF DESCRIPTION OF THE DRAWINGS

Reference will now be made to the accompanying drawings, wherein.

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description.

Figure 1:
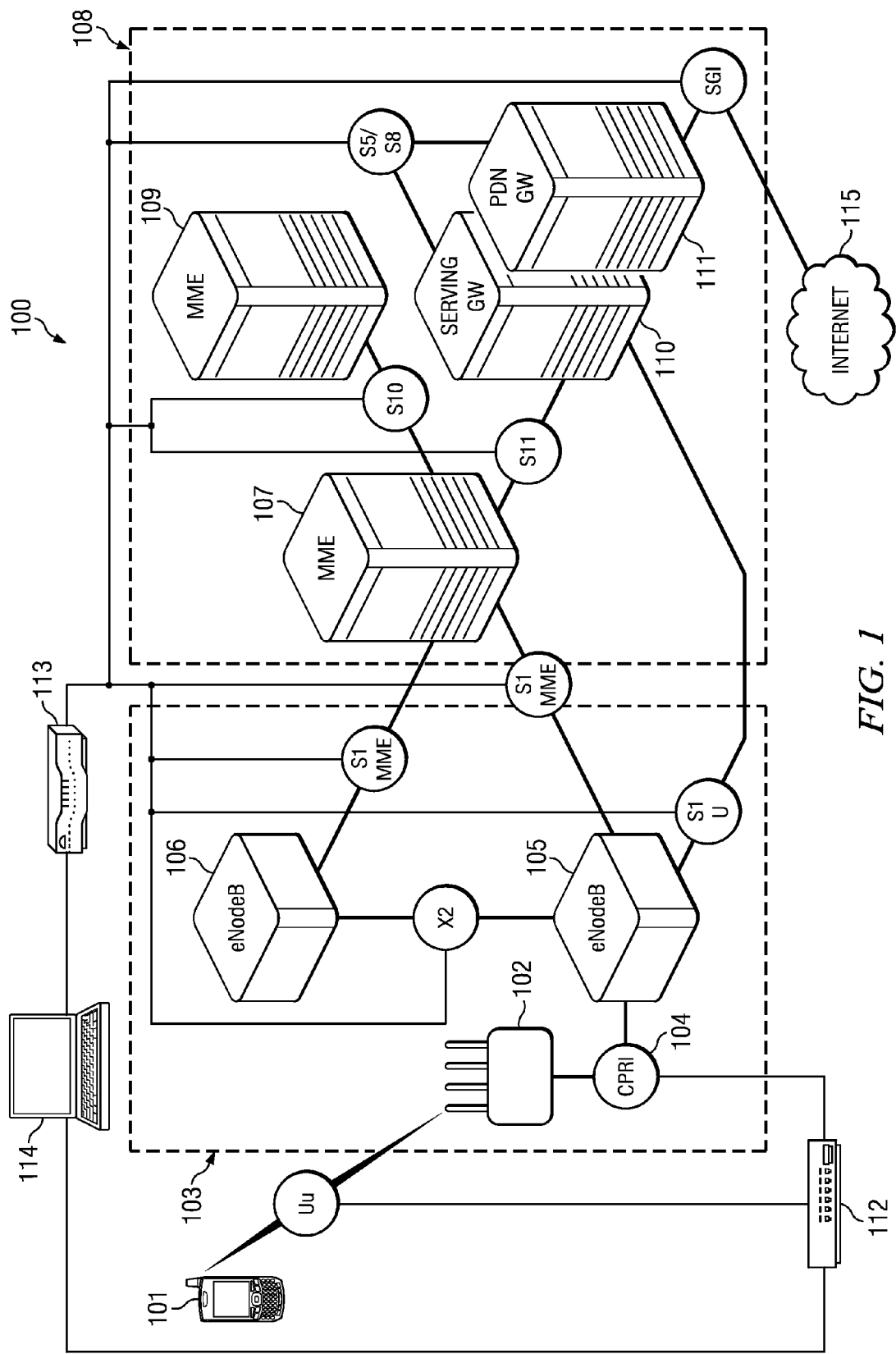
FIG. 1 is a block diagram of a Long Term Evolution (LTE) network according to some embodiments.

Turning now to FIG. 1, a block diagram of LTE network 100 is shown according to some embodiments. As illustrated, user equipment (UE) 101 may be capable of transmitting and receiving data (e.g., web pages, audio, video, etc.) across LTE network 100, which includes LTE access portion 103 and Evolved Packet Core (EPC) portion 108. In operation, UE 101 may transmit and receive signals over wireless or air interface Uu to and from Evolved-Universal Terrestrial Radio Access Network (UTRAN) Node B (eNB) 105. In some cases, a baseband processing unit within eNB 105 may be coupled to remote radio head 102 via Common Public Radio Interface (CPRI) 104. Additional UE devices (not shown) may communicate with eNB 105 or 106 depending upon their respective cells or physical locations.

UE device 101 may include any computer system or device such as, for example, a personal computer, laptop computer, tablet computer, mobile device, smart phone, network-enabled device, web-enabled television, and the like. As such UE device 101 may allow users to carry out voice communications, navigate the Internet or other data networks using a web browser application or the like via a Graphical User Interface (GUI), etc. Generally, eNBs 105 and 106 are base stations configured to handle radio communications with multiple devices in a cell and to carry out radio resource management and handover decisions, and may be coupled to each other via an X2 interface. As shown, eNBs 105 and 106 are coupled to Mobility Management Entity (MME) 107 and 109 of CPE 108 via S1-MME interfaces. MMEs 107 and 109 serve as control nodes for LTE access network 103, and may be coupled to each other via the S10 interface. MMEs 107 and 109 are responsible for idle mode UE tracking and paging procedures, including retransmissions, bearer activation/deactivation processes, UE authentication, generation and allocation of temporary identities to UEs, enforcement of roaming restrictions, ciphering/integrity protection, etc. MMEs 107 and 109 may also provide a control plane for mobility between LTE and other access networks (e.g., 2G/3G, not shown).

MMEs 107 and/or 109 are coupled to Serving Gateway (SGW) 110 via the S11 interface, and eNB 105 is coupled to SGW 110 via the S1-U interface. SGW 110 may be configured to route and forward user data packets, while also acting as the mobility anchor for the user plane during inter-eNB handovers as well as other 3GPP technologies. When UE 101 is in an idle state, SGW 110 may terminate its downlink data path and trigger paging when downlink data arrives for that UE. SGW 110 may also manage and store UE contexts and network internal routing information, and perform replication of the user traffic. SGW 110 is coupled to Packet Data Network (PDN) gateway (PGW) 111 via the S5/S8 interface. PGW 111 provides connectivity from UE 101 to external packet data networks (e.g., the Internet 115) by being the point of exit and entry of traffic for UE 101 via the SGi interface. It should be noted that, in some cases, a single UE 101 may have simultaneous connectivity with more than one PGW 111 for accessing multiple PDNs. PGW 111 may perform policy enforcement, packet filtering for each user, charging support, lawful interception, packet screening, etc. PGW 111 may also act as the anchor for mobility between 3GPP and non-3GPP technologies (e.g., WiMAX).

The Uu air interface allows UE 101 to communicate with eNB 105 using the Radio Resource Control (RRC) protocol. Above the RRC layer is the Evolved Packet System (EPS) Non-Access Stratum (NAS) layer protocol, which is carried all the way to MME 107. S1 is a standardized interface between eNBs 105 and 106 and EPC 108. S1 has two forms: S1-MME for exchange of signaling messages between the eNBs 105/106 and MMEs 107/109, and S1-U for the transport of user datagrams between eNB 105 and SGW 110. S1-MME is an interface by which an eNB (e.g., 105) communicates with an MME (e.g., 107) using the S1-AP protocol with the EPS NAS Layer protocol on top of S1-AP. The S1-MME interface uses Stream Control Transmission Protocol (SCTP) transport, and may be directly monitored. In addition, the EPS NAS layer, which is ciphered in production networks, may be deciphered by the monitoring system if the keys from the S6a interface (not shown) are monitored. Wireline interface probe 113 may be coupled to the nodes or links in the LTE network to passively monitor and collect signaling data from the network. Wireline interface probe 113 may then generate Session Records and Data Records containing S1-AP signaling information.

Still referring to FIG. 1, wireless interface probe 112 may be configured to capture baseband radio frequency (RF) samples exchanged over CPRI 104 between remote radio head 102 and eNB 105's baseband processing unit. In this case, wireless interface probe 112 monitors the Uu air interface using feeds that originate out of eNB 105. The format of such feeds may be vendor dependent, but it carries information from the RRC layer and sometimes the EPS NAS layer or/and the Radio Link Control (RLC)/Media Access Control (MAC) layer. Additionally or alternatively, wireless interface probe 112 may capture transmitted RF signals communicated between UE 101 and remote radio head 102 "over-the-air." In this case, wireless interface probe 112 monitors the LTE Uu interface "over-the-air." Wireless interface device 112 may analyze and process the captured RF transmissions to extract Uu PDUs that are combined to create session records containing the RLC/MAC/RRC and EPS NAS layer information. An example of a device suitable for use as probe 112 includes the K2Air™ LTE air interface-monitoring probe, available from Tektronix, Inc.

Wireline interface probe 113 may be configured to capture packets, messages, and/or other signaling information from interfaces such as, for example, X2, S1-U, S1-MME, S11, S10, S5/S8, and/or SGi. Examples of devices suitable for use as probe 113 include the K18™ GbE probe and the High.Link-4G™ probe, which are also available from Tektronix, Inc. Both the wireless interface probe 112 and the wireline interface probe 113 are coupled to monitoring system 114, which may be configured to correlate messages, signals, and/or other data exchanged over the LTE Uu and S1-MME interfaces as described in more detail below.

Figure 2:
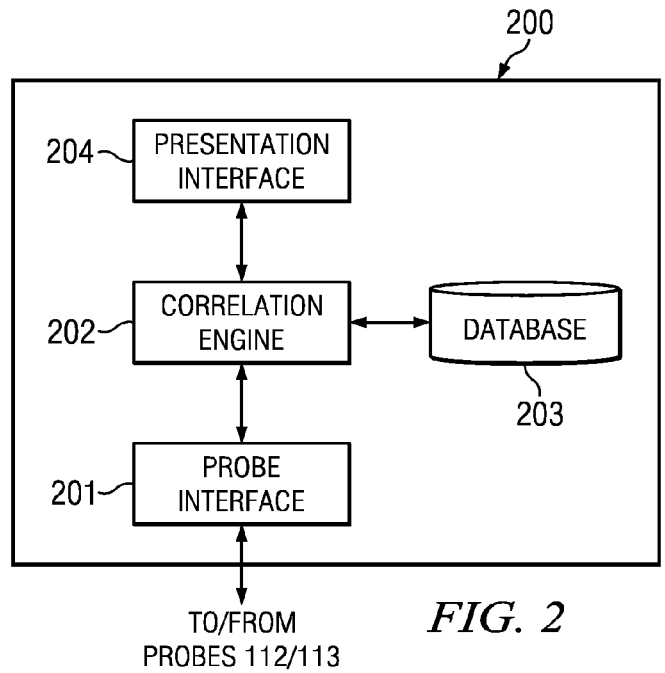
FIG. 2 is a block diagram of block diagram of LTE network monitoring system software according to some embodiments.

FIG. 2 is a block diagram of network monitoring system software 200 according to some embodiments. In some implementations, monitoring software 200 may be a software application executable by monitoring system 114 of FIG. 1. Particularly, probe interface 201 may be configured to receive messages, signals, and/or data collected or intercepted over the Uu interface (e.g., over-the-air or from CPRI 104) by probe 112, as well as other messages, signals, and/or data collected or intercepted over the S1-MME interface by probe 113. Correlation engine 202 may receive this information from probe interface 201, and may store at least a portion of it within database 203.

Correlation engine 202 may also be configured to perform one or more correlation operations, for example, as described in connection with FIG. 4 below. Results of these correlation operations may be presented to a user, for example, via presentation interface or layer 204, which may include a GUI, a command line interface, or the like. The user may also control one or more parameters of the operations performed by correlation engine 202 via presentation interface 204.

In some embodiments, network monitoring system software 200 may be configured to capture data packets from Uu and/or S1-MME interfaces, including, for example, data from one or more HTTP requests or sessions (or any other suitable protocol), and to correlate those packets. As such, software 200 may determine identifying information for the captured data packets and may combine related data into session or request records. Network monitoring system software 200 may store feed session records in database 203. In some cases, a session record may include multiple segments that are provided periodically while an associated session is active. LTE network monitoring system software 200 may also be configured to, for example, extract session data from each session record and to identify the protocol for each session record.

LTE network monitoring system software 200 may allow a service provider for network 100 to collect data from various requests or sessions concurrently or simultaneously. Data for multiple sessions is stored in database 203, which allows the service provider to track each session or to extract system-wide parameters. Data stored in database 203 may be queried by the service provider, for example, on a per-session, per-user, per-device, or per-protocol basis. Network monitoring system software 200 may use the collected information to generate Quality-of-Experience (QoE), Key Quality Indicators (KQIs), and/or Key Performance Indicators (KPIs) for each session and for the overall network. These various metrics may be based, for example, upon how often re-buffering, screen resolution changes, gaps, and/or missing fragments are detected. For instance, excessive buffering during a given session (i.e. re-buffering), numerous screen resolution changes, and gaps in the VoIP stream may lower a user's QoE.

In some embodiments, the modules or blocks shown in FIG. 2 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of modules 201-204 may be implemented such that its operations are divided among two or more logical blocks. Although shown with a particular configuration, in other embodiments these various modules or blocks may be rearranged in other suitable ways.

Figure 3:
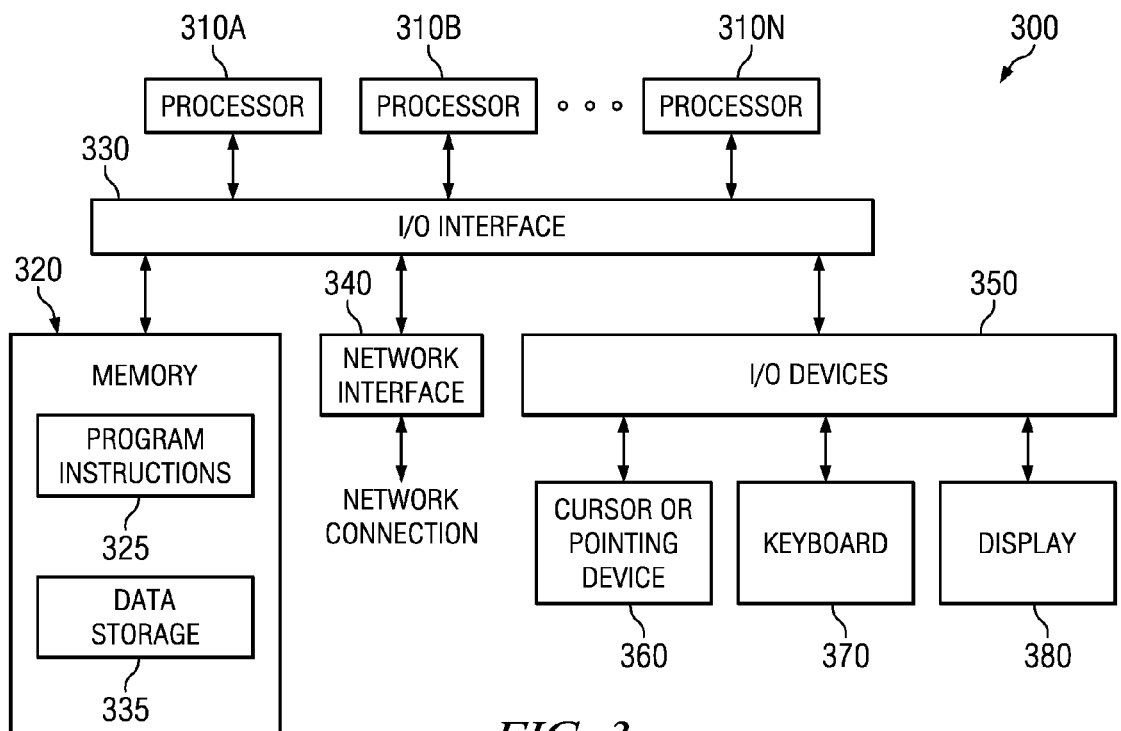
FIG. 3 is a block diagram of a computer configurable to implement an LTE network monitoring system according to some embodiments.

Embodiments of network monitoring system 114 may be implemented or executed by one or more computer systems. One such computer system is illustrated in FIG. 3. In various implementations, computer system 300 may be a server, a mainframe computer system, a workstation, a network computer, a desktop computer, a laptop, or the like. For example, in some cases, LTE network monitoring system 114 shown in FIG. 1 may be deployed as computer system 300. Moreover, one or more of elements 101, 105-107, and 109-113 may include one or more computers in the form of computer system 300. As explained above, in different embodiments these various computer systems may be configured to communicate with each other in any suitable way, such as, for example, via a computer network.

As illustrated, computer system 300 includes one or more processors 310 coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In some embodiments, a given entity (e.g., network monitoring system 114) may be implemented using a single instance of computer system 300, while in other embodiments multiple such systems, or multiple nodes making up computer system 300, may be configured to host different portions or instances of embodiments. For example, in an embodiment some elements may be implemented via one or more nodes of computer system 300 that are distinct from those nodes implementing other elements (e.g., a first computer system may execute software implementing probe interface 201 while another computer system may execute software implementing correlation engine 202).

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described herein, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-accessible medium may include any tangible storage media or memory media such as magnetic or optical media—e.g., disk or CD/DVD-ROM coupled to computer system 300 via I/O interface 330. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In an embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments some or all of the functionality of I/O interface 330, such as an interface to system memory 320, may be incorporated directly into processor 310.

Network interface 340 may be configured to allow data to be exchanged between computer system 300 and other devices attached to a computer, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 350 may, in some embodiments, include one or more display terminals, keyboards, keypads, touch screens, scanning devices, voice or optical recognition devices, or any other devices suitable for entering or retrieving data by one or more computer system 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data accessible by program instructions 325. In an embodiment, program instructions 325 may include software elements of embodiments illustrated in FIG. 2. For example, program instructions 325 may be implemented in various embodiments using any desired programming language, scripting language, or combination of programming languages and/or scripting languages (e.g., C, C++, C#, JAVA®, JAVASCRIPT®, PERL®, etc). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

Figure 4:
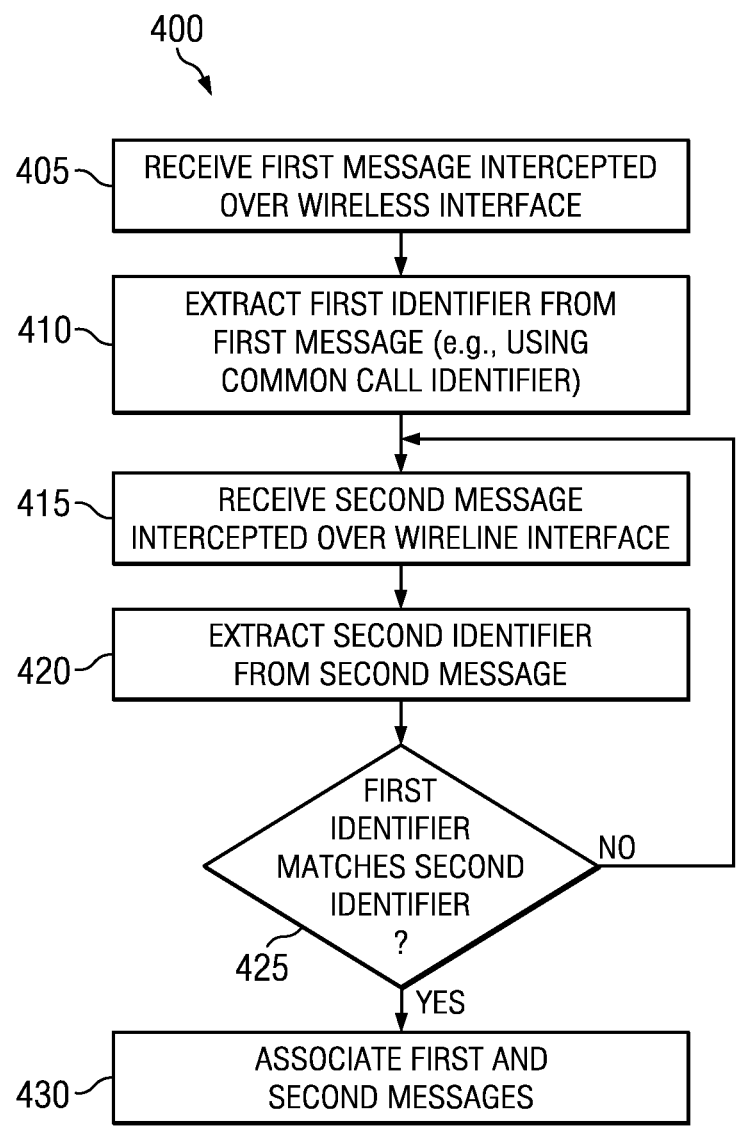
FIG. 4 is a flowchart of a method of performing LTE interface correlation according to some embodiments.

FIG. 4 is a flowchart of method 400 of performing LTE interface correlation. In some embodiments, method 400 may be performed, at least in part, by network monitoring system 114 (of FIG. 1) executing network monitoring system software 200 (of FIG. 2). At block 405, method 400 may receive a first message intercepted from or over a wireless LTE interface. For example, probe interface 201 may receive a message, signal, or other data obtained by wireless interface probe 112 from the Uu interface (e.g., either "over the air" or from CPRI 104). At block 410, method 400 may extract a first identifier (or set of identifiers) from the first message. Alternatively a first identifier (or set of identifiers) may be added to the first message by searching within database 203. For example, correlation engine 202 may implement a selected one or more of the different correlation schemes described below to obtain the first identifier.

At block 415, method 400 may receive a second message intercepted over a wireline interface. For example, probe interface 201 may receive a message, signal, or other data obtained by wireline interface probe 113 from the LTE S1-MME interface. At block 420, method 400 may extract a second identifier (or set of identifiers) from the second message following the same selected correlation scheme(s) as in block 410. At block 425, method 400 may determine whether the first identifier (or set of identifiers) matches the second identifier (or set of identifiers). For example, correlation engine 202 may compare the two (or more) identifiers according to the selected correlation scheme. If there is a match, the first and second messages may be associated with each other, for example, as belonging to the same subscriber, to the same UE, to the same session, etc. Otherwise control returns to block 415 and method 400 proceeds with another comparison between other message(s) and/or identifier(s).

In some embodiments, the correlation scheme used in method 400 may be selected by a user, and/or it may be a function of the type of equipment deployed in LTE network 100. Along with the correlation scheme selection, the user may also select a time window within which method 400 attempts to perform the comparison of block 425. For example, in some cases, a user may select a maximum time window (e.g., +/−N seconds) that can potentially separate the time stamps and/or times of arrival at probe interface 201 of the first and second messages, so that engine 202 performs a corresponding search for matching messages (e.g., within database 203).

It should be understood that the various operations described herein, particularly in connection with FIG. 4, may be implemented in software, hardware, or a combination thereof. The order in which each operation of a given method is performed may be changed, and various elements of the systems illustrated herein may be added, reordered, combined, omitted, modified, etc. It is intended that the invention(s) described herein embrace all such modifications and changes and, accordingly, the above description should be regarded in an illustrative rather than a restrictive sense.

As noted above, method 400 may perform one or more different correlation schemes that are particularly well adapted to correlate messages, signals, and/or data exchanged over a Uu interface (e.g., "over the air" or from CPRI 104) with other messages, signals, and/or data exchanged over the S1-MME wireline interface between an eNB (e.g., 105) and an MME (e.g., 107) within EPC 108 of LTE network 100. Each of these different correlation schemes may be selected depending upon the format of the Uu feeds (which may be vendor specific) and/or as a function of the information available in the Uu feeds. Also, in some cases, two or more of these correlation schemes may be used in combination with each other. Examples of these various Uu and S1-MME correlation schemes are described in turn below:

S-TMSI Correlation

In some embodiments, the first message received at block 405 of method 400 may be a Uu Radio Resource Control (RRC) Connection Request message, and the second message received at block 415 may be the S1-MME Initial UE message including at least one of: an Evolved Packet System (EPS) Attach Request, an EPS Tracking Area Update (TAU) Request, or an EPS Service Request. Moreover, the first identifier obtained at block 410 may be a System Architecture Evolution (SAE) Temporary Mobile Subscriber Identity (S-TMSI) extracted from the Uu RRC Connection Request, and the second identifier obtained at block 420 may be the S-TMSI extracted from the S1-MME Initial UE Message.

In some cases, the first S-TMSI identifier may be extracted from the LTE Uu RRC Connection Request message (when available) by probe 112 and/or by LTE monitoring system 114. This parameter is not subject to EPS NAS confidentiality protection, and hence may be readily extracted when present. The second S-TMSI identifier may also be extracted from S1-MME Initial UE message (e.g., the Attach Request and TAU Request carry a Globally Unique Temporary ID (GUTI), which contains the S-TMSI value, by probe 113 and/or by LTE monitoring system 114. Once S-TMSI values are extracted, the LTE Uu and S1-MME interface signaling may be correlated by determining whether the first and second S-TMSI identifiers match each other in block 425. As noted above, in some cases, correlation engine 202 may search for matching S-TMSI values within a selected time window (e.g., +−5 seconds) from the start of the LTE Uu and S1-AP signaling to reduce the scope of the search.

eNB-UE-S1AP-Id and MME-UE-S1AP-Id Correlation

In some embodiments, each of the first and second identifiers extracted in blocks 410 and 420 may include two or more elements. For example, the first identifier may include a combination of an Application Protocol Identity (AP-Id) allocated to a UE device over the S1 interface within the eNB (eNB-UE-S1AP-Id) with another AP-Id allocated to the UE device over the S1 interface within the MME (MME-UE-S1AP-Id). These fields are not directly available in LTE Uu RRC signaling. However these fields are available in LTE Uu RRC signaling from certain vendor specific eNodeB trace feeds that are generated out of the eNodeB and/or over-the-air. Accordingly, a first set of eNB-UE-S1AP-Id and MME-UE-S1AP-Id fields may be extracted from an eNB trace feed or over-the-air with a probing device (e.g., probe 112). In some cases, these fields are present only in the S1-MME signaling in certain vendor specific eNodeB trace feeds that are generated out of the eNodeB. The eNodeB traces feeds also provide a common call identifier for the S1-MME and LTE Uu RRC signaling for the same UE. Using the common call identifier, a first set of eNB-UE-S1AP-Id and MME-UE-S1AP-Id fields may be extracted from the S1-MME signaling and added to the LTE Uu RRC Session records that are generated by 112.

On the other hand, the second identifier may include a combination of an eNB-UE-S1AP-Id with an MME-UE-S1AP-Id extracted from the S1-AP message with a wireline probing device (e.g., probe 113) and/or LTE monitoring system 114. The combination of these two identifiers uniquely identifies the S1-AP signaling context within a single MME. Once these two identifiers—eNB-UE-S1AP-Id and MME-UE-S1AP-Id—are extracted from both monitoring entities, the LTE Uu and S1-MME interface signaling may be correlated, for example, by searching for the combination of the two ids within a limited time window (e.g., +−5 seconds) from the start of the LTE Uu and S1-AP signaling.

EPS NAS Payload Correlation

In some embodiments, the first and second identifiers in blocks 410 and 420 may each be at least a portion of an EPS NAS payload that is carried on top of RRC in the LTE Uu signaling over the LTE Uu interface and on top of the S1-AP signaling over the S1-MME interface. The former may be may either be present "in the clear" (e.g., if NAS ciphering is turned OFF) or may be deciphered by the "over-the-air" probing device (e.g., probe 112). Either the unencrypted or decrypted EPS NAS payload may then used for correlation with the S1-AP signaling. On the S1-MME interface, the EPS NAS payload that is carried on top of S1-AP signaling may be deciphered (e.g., if NAS ciphering is turned on), for example, using S6a signaling.

For example, the first identifier may be an International Mobile Subscriber Identity (IMSI), GUTI, or S-TMSI within the EPS NAS payload extracted from an Uu RRC message, and the second identifier may be another IMSI, GUTI, or S-TMSI within an EPS NAS payload extracted from the S1-MME message. One of more of these identifiers on the Uu interface may be correlated with corresponding identifier(s) in the S1-MME interface at block 425. Again, correlation engine 202 may search for matching S-TMSI values within a selected time window (e.g., +−5 seconds) from the start of the LTE Uu and S1-AP signaling.

In sum, described herein are various systems and methods for Long Term Evolution (LTE) interface correlation. In some embodiments, a monitoring entity may monitor an LTE-Uu interface, and another monitoring entity may monitor a S1-MME interface. A plurality of different correlation schemes are provided whereby LTE-Uu interface signaling may be correlated with S1-MME interface signaling, thus enabling the correlation of LTE air interface traces with known user identities (e.g., IMSI) and user equipment identifiers (e.g., IMEI, IMEI with Software Version (IMEI-SV), etc.) for further analysis. Correlation of S1-MME with LTE Uu signaling may allow a carrier or service provider to track the same user identity (e.g., IMSI) across different interfaces to identify all failure points. It may also allow the service provider to track the same user equipment identifiers (e.g., IMEI, IMEI-SV) across all interfaces to identify all failure points. Moreover, such correlation may enrich S1-MME data records with LTE Uu Radio information to better optimize network coverage, and/or it may also enrich S1-MME data records with accurate location information available in the LTE Uu signaling.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the elements such terms describe. Thus, these terms are not necessarily intended to indicate temporal or other prioritization of such elements. The term "coupled" is defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for correlating signaling in a Long Term Evolution (LTE) network for analysis of the LTE network, the method comprising the steps of:
    performing, by one or more monitoring computer systems,
        receiving a first message associated with a first user identity, the first message having been intercepted over a wireless interface of the LTE network;
        extracting a first identifier from the first message;
        receiving a second message associated with a second user identity, the second message having been intercepted over a wireline interface of the LTE network;
        extracting a second identifier from the second message;
        comparing the first and second identifiers to determine if the first and second user identities are the same; and
        associating the second message with the first message in response to the second identifier matching the first identifier when the first and second user identities are the same so that interface traces, signaling and equipment identifiers of the same user identity are correlated for analysis.

2. The method of claim 1, wherein the wireless interface is an air (Uu) interface.

3. The method of claim 2, wherein the Uu interface is probed via a Common Public Radio Interface (CPRI) between an Evolved-Universal Terrestrial Radio Access Network (UTRAN) Node B (eNB)'s remote radio head and baseband processing unit.

4. The method of claim 2, wherein the wireline interface is an S1 interface between an Evolved-Universal Terrestrial Radio Access Network (UTRAN) Node B (eNB) and a Mobility Management Entity (MME) within an Evolved Packet Core (EPC) portion of the LTE network.

5. The method of claim 4, wherein the first message is a Uu Radio Resource Control (RRC) Connection Request message, and wherein the second message is an S1-Mobility Management Entity (MME) Initial User Equipment (UE) Message including at least one of: an Evolved Packet System (EPS) Attach Request, an EPS Tracking Area Update (TAU) Request, or an EPS Service Request.

6. The method of claim 5, wherein the first identifier is a System Architecture Evolution (SAE) Temporary Mobile Subscriber Identity (S-TMSI) extracted from the Uu RRC Connection Request, and wherein the second identifier is an S-TMSI extracted from the S1-MME Initial UE Message and further comprising the step of enriching data of the Si-MME Initial UE Message with location information from Uu signaling data in the LTE network.

7. The method of claim 4, wherein the first identifier is a combination of an Application Protocol Identity (AP-Id) allocated to a UE device over the S1 interface within the eNB (eNB-UE-S1AP-Id) with another AP-Id allocated to the UE device over the S1 interface within the MME (MME-UE-S1AP-Id) extracted from an eNB trace feed or over-the-air with a probing device, and wherein the second identifier is a combination of an eNB-UE-S1AP-Id with an MME-UE-S1AP-Id extracted from an S1-AP message.

8. The method of claim 4, wherein the first identifier is an International Mobile Subscriber Identity (IMSI), Globally Unique Temporary ID (GUTI), or System Architecture Evolution (SAE) Temporary Mobile Subscriber Identity (S-TMSI) of an Evolved Packet System (EPS) Non-Access Stratum (NAS) payload extracted from an Uu RRC message or over-the-air with a probing device configured to decipher EPS NAS messages, and wherein the second identifier is an IMSI, GUTI, or S-TMSI of an EPS NAS payload extracted from an S1-MME message.

9. The method of claim 1, the first and second messages having been intercepted within a preselected time window.

10. A system, comprising:
a processor; and
a memory coupled to the processor, the memory configured to store program instructions executable by the processor to cause the system to:
receive a first message associated with an user identity, the first message having been intercepted over an air (Uu) interface of a Long Term Evolution (LTE) network, the first message having a first identifier;
receive a second message associated with an user identity, the second message having been intercepted over an S1 interface between an Evolved-Universal Terrestrial Radio Access Network (UTRAN) Node B (eNB) and a Mobility Management Entity (MME) within an Evolved Packet Core (EPC) portion of the LTE network within a configurable time window from the first message, the second message having a second identifier; and
correlate the first message with the second message in response to a match between the first and second identifiers indicating that the user identities are the same so that interface traces, signaling and equipment identifiers of the same user identity are correlated for analysis.

11. The system of claim 10, the Uu interface having been probed via a Common Public Radio Interface (CPRI) between the eNB's remote radio head and baseband processing unit.

12. The system of claim 10, wherein the first message is a Uu Radio Resource Control (RRC) Connection Request message, and wherein the second message is an S1-Mobility MME Initial User Equipment (UE) Message including at least one of: an Evolved Packet System (EPS) Attach Request, an EPS Tracking Area Update (TAU) Request, or an EPS Service Request.

13. The system of claim 12, wherein the first identifier is a System Architecture Evolution (SAE) Temporary Mobile Subscriber Identity (S-TMSI) extracted from the Uu RRC Connection Request, and wherein the second identifier is an S-TMSI extracted from the S1-MME Initial UE Message.

14. The system of claim 10, wherein the first identifier is a combination of an Application Protocol Identity (AP-Id) allocated to a UE device over the S1 interface within the eNB (eNB-UE-S1AP-Id) with another AP-Id allocated to the UE device over the S1 interface within the MME (MME-UE-S1AP-Id) extracted from an eNB trace feed or over-the-air with a probing device, and wherein the second identifier is a combination of an eNB-UE-S1AP-Id with an MME-UE-S1AP-Id extracted from an S1-AP message.

15. The system of claim 10, wherein the first identifier is an International Mobile Subscriber Identity (IMSI), Globally Unique Temporary ID (GUTI), or System Architecture Evolution (SAE) Temporary Mobile Subscriber Identity (S-TMSI) of an Evolved Packet System (EPS) Non-Access Stratum (NAS) payload extracted from an Uu RRC message or over-the-air with a probing device configured to decipher EPS NAS messages, and wherein the second identifier is an IMSI, GUTI, or S-TMSI of an EPS NAS payload extracted from an S1-MME message.

16. A tangible electronic storage medium having program instructions stored thereon that, upon execution by a processor within a computer system, cause the computer system to:
receive a first message associated with an user identity, the first message having been intercepted over an air (Uu) interface of a Long Term Evolution (LTE) network probed via a Common Public Radio Interface (CPRI) between an Evolved-Universal Terrestrial Radio Access Network (UTRAN) Node B (eNB)'s remote radio head and baseband processing unit, the first message having a first identifier;
receive a second message associated with an user identity, the second message having been intercepted over an S1 interface between the eNB and a Mobility Management Entity (MME) within an Evolved Packet Core (EPC) portion of the LTE network within a given time window from the first message, the second message having a second identifier; and
correlate the first and second messages in response to a match between the first and second identifiers indicating that the user identities are the same so that interface traces, signaling and equipment identifiers of the same user identity are correlated for analysis.

17. The tangible electronic storage medium of claim 16, wherein the first message is a Uu Radio Resource Control (RRC) Connection Request message, and wherein the second message is an S1-MME Initial User Equipment (UE) Message including at least one of: an Evolved Packet System (EPS) Attach Request, an EPS Tracking Area Update (TAU) Request, or an EPS Service Request.

18. The tangible electronic storage medium of claim 17, wherein the first identifier is a System Architecture Evolution (SAE) Temporary Mobile Subscriber Identity (S-TMSI) extracted from the Uu RRC Connection Request, and wherein the second identifier is an S-TMSI extracted from the S1-MME Initial UE Message.

19. The tangible electronic storage medium of claim 16, wherein the first identifier is a combination of an Application Protocol Identity (AP-Id) allocated to a UE device over the S1 interface within the eNB (eNB-UE-S1AP-Id) with another AP-Id allocated to the UE device over the S1 interface within the MME (MME-UE-S1AP-Id) extracted from an eNB trace feed, and wherein the second identifier is a combination of an eNB-UE-S1AP-Id with an MME-UE-S1AP-Id extracted from an S1-AP message.

20. The tangible electronic storage medium of claim 16, wherein the first identifier is an International Mobile Subscriber Identity (IMSI), Globally Unique Temporary ID (GUTI), or System Architecture Evolution (SAE) Temporary Mobile Subscriber Identity (S-TMSI) of an Evolved Packet System (EPS) Non-Access Stratum (NAS) payload extracted from an Uu RRC message, and wherein the second identifier is an IMSI, GUTI, or S-TMSI of an EPS NAS payload extracted from an S1-MME message.

21. The method of claim 1, further comprising the step of identifying failure points in the LTE network based upon tracking the same user identity across different interfaces.

* * * * *